United States Patent
Babbar (10) Patent No.: US 8,537,762 B2
(45) Date of Patent: Sep. 17, 2013

(54) SYSTEM AND METHOD FOR OPTIMALLY TRANSFERRING DATA TRAFFIC ON NETWORKS

(75) Inventor: Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 890 days.

(21) Appl. No.: 12/430,529

(22) Filed: Apr. 27, 2009

(65) Prior Publication Data

US 2010/0272030 A1 Oct. 28, 2010

(51) Int. Cl.
| H04W 76/02 | (2009.01) |
| H04J 3/16 | (2006.01) |
| G06F 15/173 | (2006.01) |
| G06F 15/16 | (2006.01) |
| G06F 21/00 | (2006.01) |

(52) U.S. Cl.
USPC .......... 370/329; 370/437; 709/228; 709/236; 713/182

(58) Field of Classification Search
USPC .......... 370/329, 437; 709/228, 236; 713/182
See application file for complete search history.

(56) References Cited

U.S. PATENT DOCUMENTS

| 2001/0037394 A1* | 11/2001 | Yoshimura et al. | 709/228 |
| 2003/0027163 A1* | 2/2003 | Ashkenazi et al. | 435/6 |
| 2003/0037163 A1* | 2/2003 | Kitada et al. | 709/236 |
| 2006/0153221 A1* | 7/2006 | Huang | 370/437 |
| 2007/0130471 A1* | 6/2007 | Walker Pina et al. | 713/182 |

FOREIGN PATENT DOCUMENTS

WO WO0152499 7/2001

OTHER PUBLICATIONS

Airlink communications, Inc: Raven and Pinpoint GPRS—User Guide for Models 63210, G3211, G3310, G3311 Version 1.21, Sep. 14, 2004, XP002593678.*
Airlink communications, Inc: "Raven and Pinpoint GPRS—User Guide for Models 63210, G3211, G3310, G3311 Version 1.21" Sep. 14, 2004, XP002593678.
Carlson J, "PPP design, implementation, and debugging, 2nd ed, XP002593679 ISBN: 0201700530, USA," Addison-Wesley, 2000, pp. 47-74.
International Search Report and Written Opinion—PCT/US2010/032419, International Search Authority—European Patent Office—Aug. 6, 2006.
Simpson W., "The Point-to-Point Protocol (PPP), RFC 1661, XP002324214," Network Working Group Request for Comments, Jul. 1994, pp. 1-54.

* cited by examiner

*Primary Examiner* — Andrew Lai
*Assistant Examiner* — Albert Shih
(74) *Attorney, Agent, or Firm* — James T. Hagler (57) ABSTRACT

A system and method for configuring a data communication between a terminal computing device and a communication network, wherein the terminal computing device connects to the communication network via a mobile device is tethered to a terminal computing device and acts as a wireless modem. A second handshake operation between the computing device and mobile device occurs after a handshake operation between the mobile device and network occurs to negotiate a variety of communication protocol parameters controlling the data communication. The variety of communication protocol parameters negotiated between the mobile device and network are used in the negotiation of communication protocol parameters during the second handshake operation between the computing device and mobile device.

12 Claims, 6 Drawing Sheets

SYSTEM AND METHOD FOR OPTIMALLY TRANSFERRING DATA TRAFFIC ON NETWORKS

FIELD OF INVENTION

The present invention relates generally to wireless data communications, and more particularly to a system and method for configuring a wireless data communication call between a terminal computing device and a network using a mobile device as a wireless modem.

BACKGROUND OF INVENTION

Mobile communication devices, such as cellular telephones (generally referred to herein as "mobile devices") have become an integral electronic accessory in many people's lives. In addition to the ability to send and receive voice calls, mobile devices have become popular devices from which to conduct data communications. Many are using their mobile devices as wireless data modems connected to other computing devices (e.g., a laptop computer) to send and receive email and connect to the Internet to browse sites on the worldwide web. Since mobile devices conduct data communications over a cellular communication network whose coverage is rapidly expanding, mobile devices provide users with the ability to conduct wireless data communications over a greater geographic range than most other current technologies, such as WiFi.

Computing devices (e.g., a laptop computer) can be connected to mobile devices via a tethered cable (i.e., USB, IEEE 1394, etc) or via a wireless connection (i.e., Bluetooth, IEEE 802.11, Zigbee, etc.). When so configured, the mobile device acts as a wireless modem coupling the computing device to a cellular communications network which can provide access to the Internet. Using the mobile device as a wireless modem allows users to conduct data communications over the broad range of cellular communications network while utilizing the larger keyboard, display, memory, processor, and battery of a terminal computing device In computer networking, a "MTU" (maximum transmission unit) refers to the size (in bytes) of the largest packet or frame that a given layer of a communication protocol can pass onwards. MTU parameters usually appear in association with a communications interface (e.g., NIC, serial port, etc.). The MTU may be fixed by standards (as is the case with Ethernet) or decided at connect time (as is usually the case with point-to-point serial links). A higher MTU brings higher bandwidth efficiency. However, large packets can block a slow interface for some time, thereby increasing the lag for further packets. For example, a 1500 byte packet, the largest allowed by Ethernet at the network layer (and hence most of the Internet), would tie up a 14.4 kB modem for about one second. Regardless of whether users conduct data communications directly on a mobile device or over a computing device connected to the mobile device as a wireless modem, it is important to synchronize either the mobile device alone or the mobile device and computing device with the network to insure that the MTU set so as to optimize the data communication link.

SUMMARY

In the various embodiments a system and method are provided for synchronizing both a mobile device and a connected computing device with a network to insure that a consistent MTU is negotiated with all devices. In an embodiment, an additional link control protocol (LCP) is initiated by the mobile device with the connected computing device after the packet data protocol (PDP) context activation has been completed. This second LCP process enables the mobile device to negotiate with the computing device the appropriate MTU that has been previously negotiated with the network during the PDP context activation. Consequently, the same MTU that was negotiated between the network and the mobile device is used in the negotiation between the mobile device and the computing device.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "mobile device" refers to any one or all of cellular telephones, personal data assistants (PDA's), palm-top computers, laptop computers, wireless electronic mail receivers (e.g., the Blackberry® and Treo® devices), multimedia Internet enabled cellular telephones (e.g., the iPhone®), PCMIA cards for performing data communications over cellular telephone networks and similar personal electronic communication devices which include a programmable processor and memory. In a preferred embodiment, the mobile device is a cellular handset that can communicate via a cellular telephone network (e.g., a cellphone).

As used herein, the term "server" refers to any of a variety of commercially available computer systems configured to operate in a client-server architecture. In particular, the term "server" refers to network servers, particularly Internet accessible servers, which typically include a processor, memory (e.g., hard disk memory), and network interface circuitry configured to connect the server processor to the network, such as the Internet or a cellular telephone network.

Figure 1:
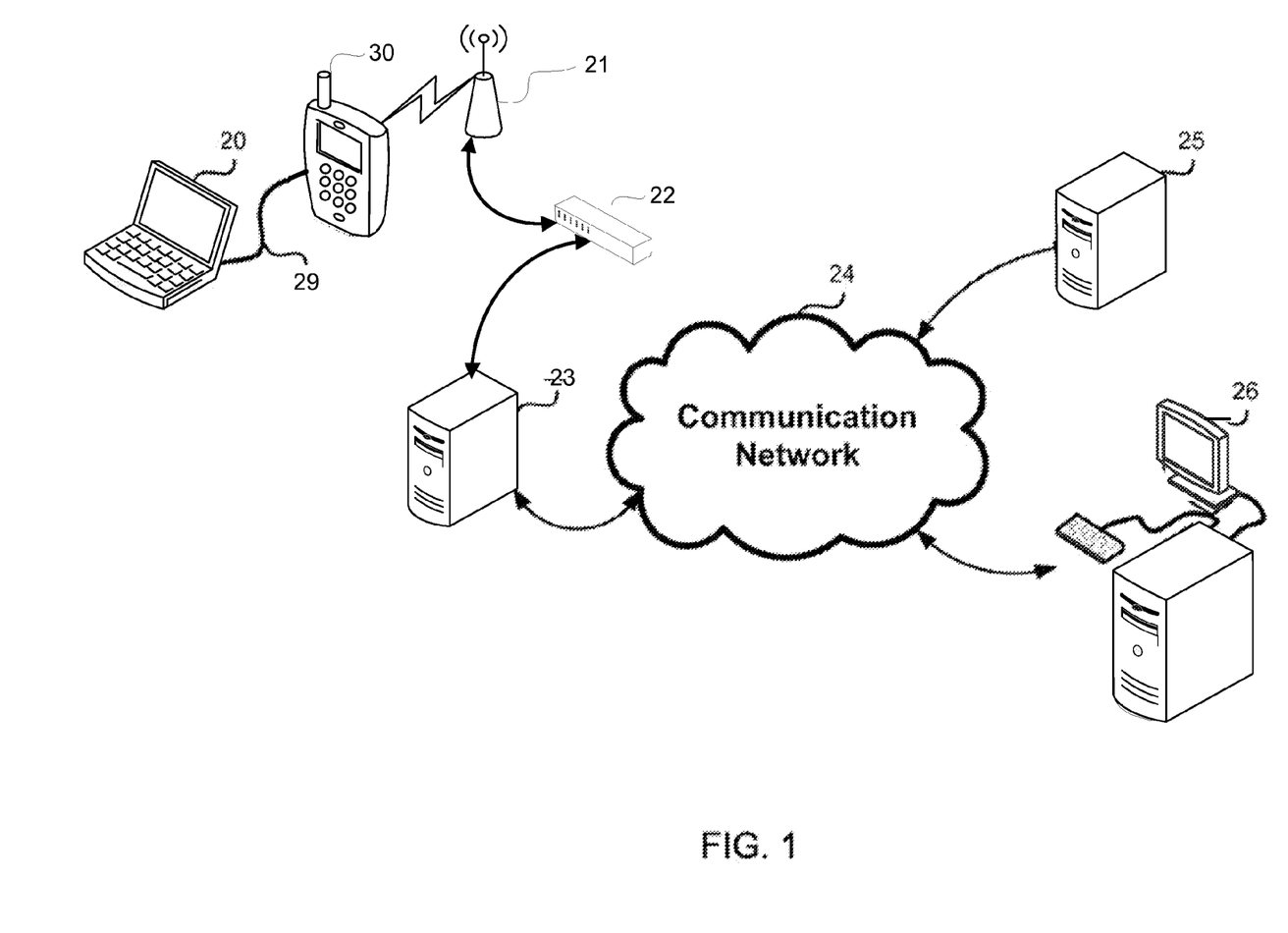
FIG. 1 is a system diagram illustrating an embodiment system in which a computing device is tethered to a mobile device acting as a wireless modem to conduct data communications.

FIG. 1 is a system diagram illustrating an embodiment system in which a mobile device acts as a wireless modem for a terminal computing device (e.g., a laptop computer) that is conducting data communications. In this system, a computing device 20 (e.g., a laptop computer as shown in FIG. 1) is connected to a mobile device 30. The computing device 20 is shown tethered to mobile device 30 via a cable 29. The cable 29 may be a USB, IEEE 1394 (Firewire®), or similar data transfer standard cable. However, the computing device 20 may also be connected to the mobile device 30 using any of a number of short range wireless technologies. For example, the computing device 20 may be connected to the mobile device 30 using Bluetooth®, IEEE 802.11 (WiFi), Zigbee® or other wireless data communication protocol. The mobile device 30 may wirelessly connect with a cellular base station 21. The base station 21 is part of a cellular network that includes elements required to operate the network, such as a mobile switching center (MSC) which serves as a network interface 22. In operation, the network interface 22 is capable of routing voice and data calls and messages to and from the mobile device 30 via the base station 21. The network interface 22 also provides a connection to telephone landline trunks (not shown) when the mobile device 28 is involved in a call. Further, the MSC may be coupled to a server gateway 23 which provides a gateway to another network 24, such as the Internet. Using the mobile device 30 as a modem to access the server gateway 23, the computing device 20 may communicate via the Internet with another server 25 or computing device 26 similarly connected to the network 24. In this manner, users utilizing their computing device 20 may conduct data calls or access the Internet wirelessly via a mobile device 30 anywhere cellular telephone network reception is available.

When users conduct data communications on a mobile device 30, the mobile device 30 conducts a handshake operation with the network (specifically a network interface 22) to negotiate various communication protocol (i.e., Internet Protocol (IP)) parameters. Included among the negotiated communication protocol parameters is the MTU to use in communication link. Through this negotiation, the mobile device 30 and the network interface 22 agree on an MTU to use after which the mobile device 30 and the network interface 22 are configured to send and receive packets of data sized to fit within the MTU.

However, when data communications connections are established between a network interface 22 and a computing device 20 using a mobile device 30 as a wireless modem, a different process for negotiating the MTU occurs. In a conventional method, the computing device 20 and mobile device 30 will typically first conduct a handshaking operation in which various communication protocol parameters are negotiated between the computing device 20 and mobile device 30. This is particularly the case when data communications occurs on a 3GPP (GSM) communication network, because the 3GPP standard requires a mobile device 30 to perform a host authentication operation with the computing device 20 before attempting to access the network interface 22. During the host authentication operation, the mobile device 30 gathers any authenticating certificates from the computing device 20 that will useful in authenticating the computing device 20 to the network interface 22. Because the mobile device 30 must first obtain the necessary authentication certificates from the computing device 20, the mobile device 30 also conducts the handshake procedure with the computing device 20 wherein the communication protocol parameters are negotiated. Among the communication protocol parameters negotiated during this first handshake between the computing device 20 and mobile device 30 will also be the MTU. Once these communication protocol parameters and certificates have been negotiated and gathered, the mobile device 30 conducts a second handshake procedure with the network interface 22 in which communication protocol parameters are negotiated between the mobile device 30 and the network interface 22. Among the communication protocol parameters negotiated during this second handshake operation will be the MTU between the mobile device 30 and the network interface 22.

Since the second handshaking procedure is a new negotiation, that procedure may reach agreement on communication protocol parameters, including the MTU, that are inconsistent with those negotiated between the mobile device 30 and the computing device 20. If the MTU negotiated during the first handshake operation (mobile device to computing device) does not match the MTU negotiated during the second handshake (mobile device to network), the wireless data link between the computing device and the network will not operate at an optimal level. For example, if the MTU between the computing device 20 and mobile device 30 is smaller than the MTU negotiated between the mobile device 30 and network, then the IP data packets being sent from the mobile device 30 to the network will not completely fill over the air frames hence leading to an inefficient usage of wireless channels. If, however, the MTU between the computing device 20 and mobile device 30 is larger than the MTU negotiated between the mobile device 30 and network, then fragmentation of IP data packets will occur in the mobile device 30. IP fragmentation occurs when IP data packets must be divided into pieces each smaller than or equal to the negotiated MTU. This IP fragmentation process takes place at the IP layer (OSI layer 3) in the transmitting device which marks divided packets so that the IP layer of the destination device knows how to reassemble the packets into the original datagram. When IP fragmentation occurs there may be a degraded data throughput as it now takes two data packets to carry the same data payload as un-fragmented data packet and second data packet will typically be partially filled thus increasing the overhead to transport that packet. Moreover, IP fragmentation requires increased CPU processing per IP packet as data packets must be fragmented before sending and reassembled upon receipt.

Figure 2:
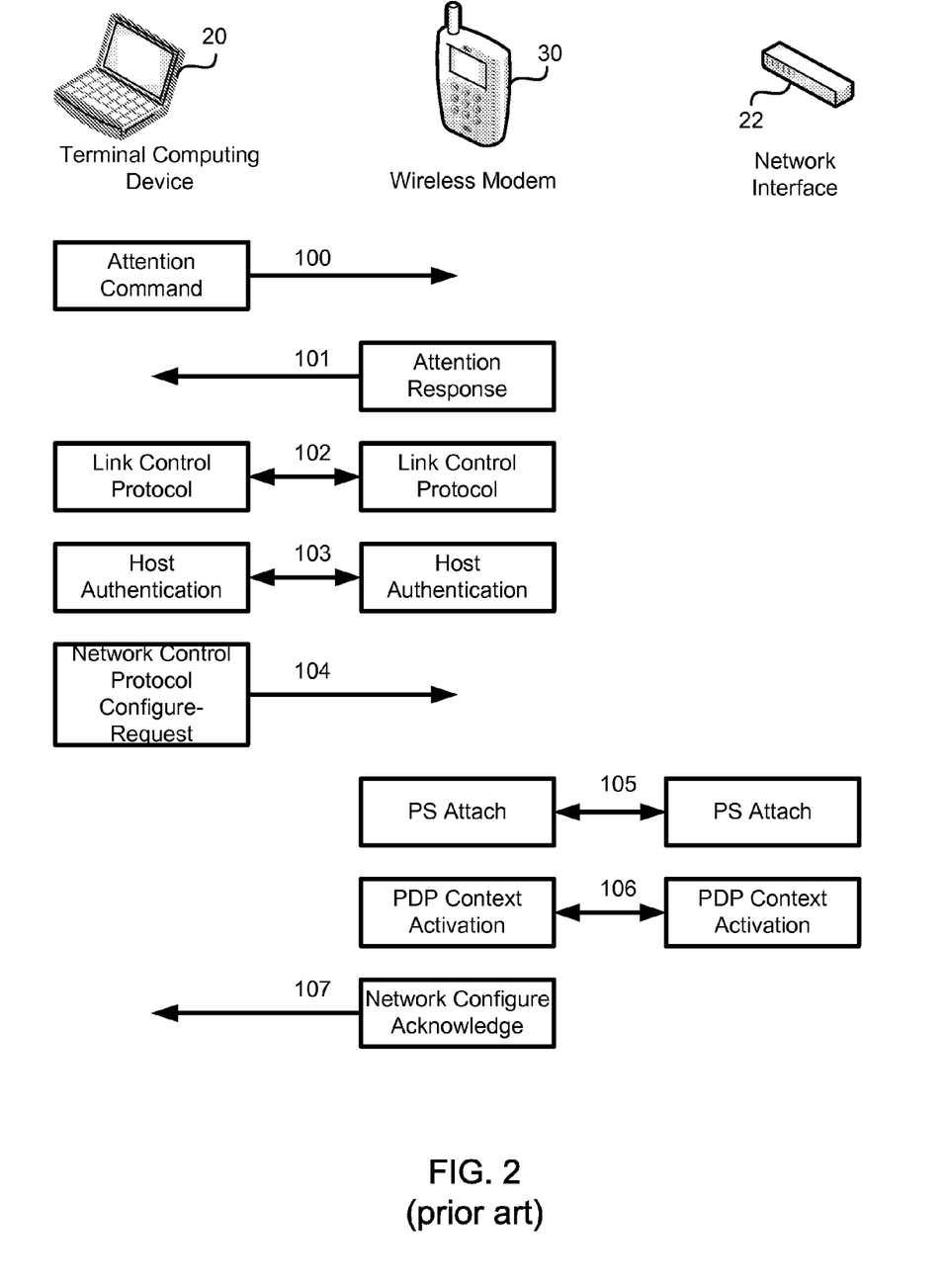
FIG. 2 is a message flow diagram illustrating the order of communications between a computing device, mobile device and network in a prior art system and method.

FIG. 2 is a message flow diagram illustrating the order of communications between a computing device, mobile device and a 3GPP network in a prior art system and method. Typically, when users conduct data communications using their computing device 20 tethered to a mobile device 30, the computing device 20 sends an attention command to the mobile device 30, message 100. The attention command is intended to awaken the wireless modem, mobile device 30, and to initiate a packet data protocol (PDP) Type IP call to establish a data communication call. In response to the attention command, message 100, the mobile device 30 returns an attention response message to the computing device 20, message 101. Once the attention response is sent, the computing device 20 and mobile device 30 being configured to serve as a wireless modem begin the Link Control Protocol (LCP) process, messages 102. LCP provides automatic configuration of the interfaces at each end of the link (including setting the MTU size) and for selecting optional authentication. The computing device 20 and mobile device 30 also conduct a Host Authentication session during which authentication certificates are requested by the mobile device 30 (slave) and provided by the computing device 20 (host), messages 103. These exchanged authentication certificates must be provided to the network interface 22 by the mobile device 30 when the connection to the network is negotiated and may be later used to access certain servers 25 or computing devices 26 connected to the network 24. Once the LCP and Host Authentication session are complete, the computing device 20 may make a Network Control Protocol (NCP) Configuration Request, message 104. The NCP is used for negotiating network-layer information, e.g. network address or compression options, after the data connection has been established. In order to establish the connection over the 3GPP network a packet service (PS) network must be attached, messages 105. The PS network may be attached at any time prior to the PDP context activation, messages 106. The PDP context is a data structure which contains the mobile device's 30 session information when the mobile device 30 has an active session. When a mobile device 30 conducts a data communication call to the network, it must first attach and then activate a PDP context. During the PDP context activation, the mobile device 30 receives various data communication configuration parameters from the network interface 22. These parameters may include the maximum send data unit (SDU), MTU, authentication challenges, etc. Once the PDP context has been attached and activated, the mobile device 30 sends a NCP configuration acknowledgment to the computing device 20, message 107. Once the NCP Configuration Acknowledgement has been received by the computing device 20, the transmission and receipt of IP data packets may commence. Because the mobile device 30 negotiates various communication protocol parameters with the computing device 20 in the LCP before negotiating the same communication protocol parameters with the network interface 22 during the PDP context activation operation, there may be inconsistencies between the communication protocol parameters negotiated during the two separate negotiations. These inconsistencies may cause the data communication to either fail or operate at a sub-optimal level. Moreover, if the data communication will fail due to the inconsistencies, the user may not see explicit failure but rather a disruption of service causing a bad user experience.

Figure 3:
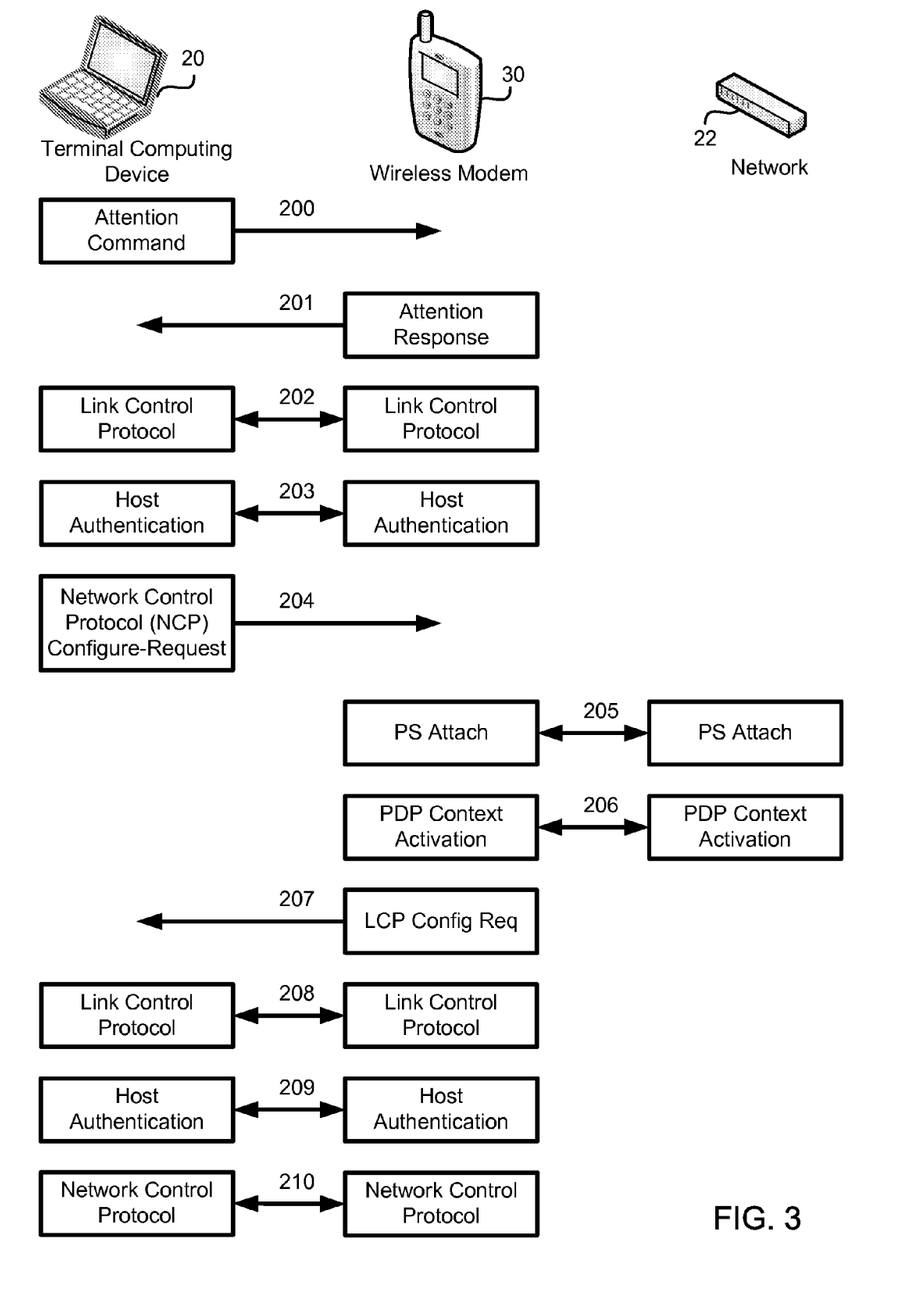
FIG. 3 is a message flow diagram illustrating the order of communications between a computing device, mobile device and network in an embodiment system and method.
Figure 4:
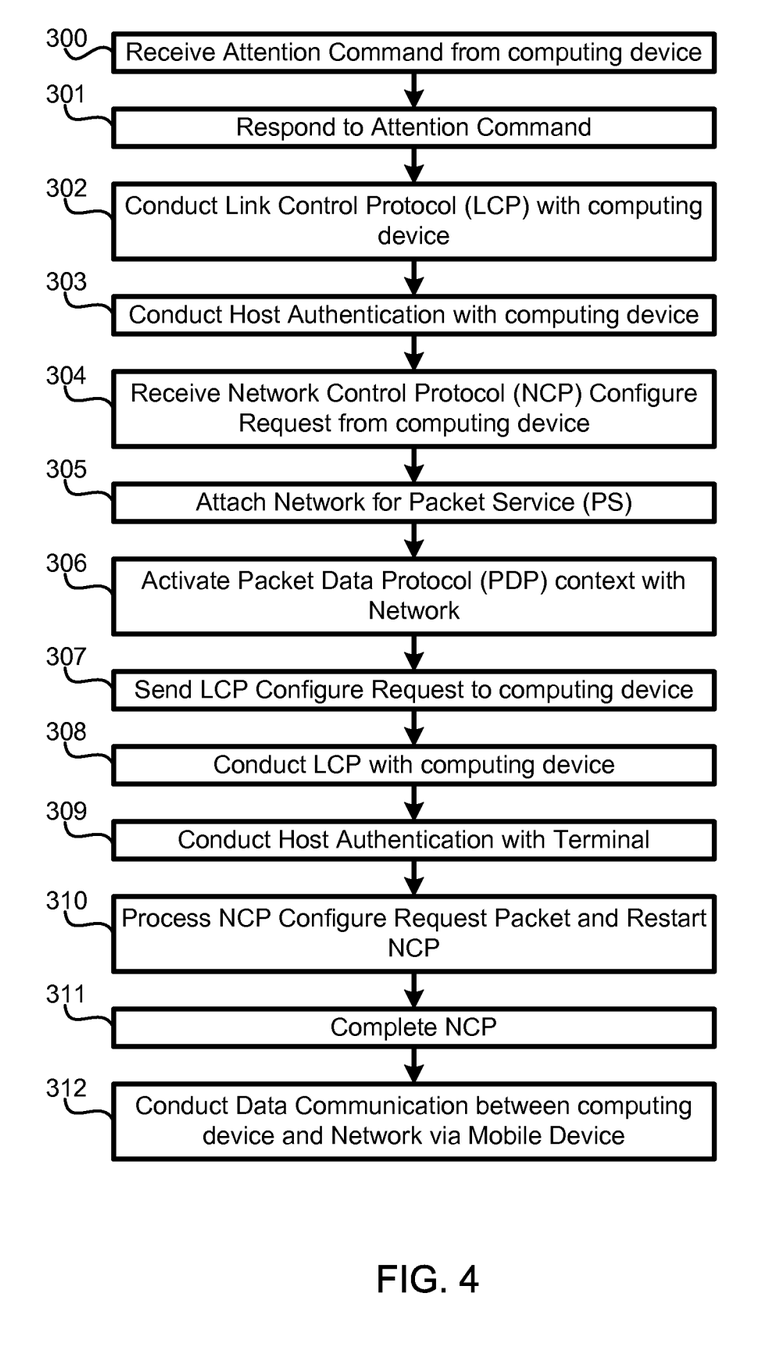
FIG. 4 is a process flow diagram illustrating steps of an embodiment method by which a mobile device negotiates a MTU to implement with the network and the computing device.

In order to avoid the possibility of these inconsistencies, the various embodiments perform a second negotiation between the computing device 20 and mobile device 30 after the communication protocol parameters are negotiated with the network interface 22. FIG. 3 is a message flow diagram illustrating the order of communication messages exchanged between a computing device 20, mobile device 30 and network interface 22 in an embodiment system and method. FIG. 4 is a process flow diagram illustrating the steps of an embodiment method by which a mobile device negotiates a MTU to implement with the network and computing device. Referring to FIGS. 3 and 4 together, a computing device 20 initiates a communication link by sending an Attention Command, message 200, which is received by the mobile device 30, step 300. The Attention Command is intended to awaken the mobile device 30 and initiate the PDP Type IP data communication over the mobile device 30 to the network interface 22. Once the mobile device 30 receives an Attention Command from the computing device 20, the mobile device 30 responds, step 301, by returning an Attention Response, message 201. Once the attention response is sent, the mobile device 30 conducts a Link Control Protocol (LCP) with the computing device 20, step 302, by initiating the exchange of a series of LCP messages, message 202. During the LCP process, step 302, the mobile device 30 negotiates various communication protocol parameters with the computing device 20 that can be used for the data communication call with the network interface 22. These communication protocol parameters include the MTU size. The mobile device 30 also conducts a Host Authentication session with the computing device 20, step 303, during which authentication certificates may be exchanged, messages 203. Once the LCP and Host Authentication session are complete, steps 302, 303, the mobile device 30 receives a Network Control Protocol (NCP) Configuration Request from the computing device 20, message 204 and step 304. The NCP is used for negotiating network-layer information, e.g. network address or compression options, after the data connection has been established. In order to establish the connection over the 3GPP network the mobile device 30 attaches a packet service (PS) network, step 305, by sending message 205 to the network interface 22 and receiving associated replies. The mobile device 30 may attached a PS network, step 306, at any time prior to the packet data protocol (PDP) context activation, step 206, which is accomplished by sending message 206 to the network interface 22 and receiving associated replies. The PDP context is a data structure which contains the mobile device's 30 session information when the mobile device 30 has an active session. When a mobile device 30 conducts a data communication call to the network interface 22, it must first attach and then activate a PDP context, step 306. During the PDP context activation, step 306, the mobile device 30 receives various data communication configuration parameters from the network 24, messages 206. These parameters may include the maximum send data unit (SDU), MTU, authentication challenges, etc.

Once the PDP context activation step 306 is complete and the mobile device 30 has negotiated each of the various communication protocol parameters with the network 24, the mobile device 30 takes these parameters and sends a LCP configuration request back to the computing device 20, step 307 and message 207. Using the communication protocol parameters obtain during the PDP context activation step 306, the mobile device 30 negotiates the communication protocol parameters with the computing device 20 during a second LCP, step 308, by exchanging messages 208. Conducting a second LCP negotiation with the computer device 20, step 308, allows the mobile device 30 to insure that there are no inconsistencies among the various communication protocol parameters negotiated with the computing device 20 and with the network interface 22. In addition, the mobile device 30 conducts a second Host Authentication session with the computing device 20, step 309, by exchanging messages 209. During the second Host Authentication session, various authentication certificates may be exchanged between the mobile device 30 and computing device 20. Once both the LCP and Host Authentication sessions are complete, steps 308, 309, the NCP must be restarted. Accordingly, an NCP configuration request packet must be processed. The NCP configuration request packet may be sent from either the computing device 20 and/or the mobile device 30, step 310 and message 210. Once the NCP Configuration request has been received NCP is restarted. Once NCP is successfully complete, step 311, the transmission and receipt of IP data packets from the computing device 20 to the network interface 22 via the mobile device 30 may commence, step 312

By conducting the second LCP session after the PDP context activation operation, step 308, the mobile device 30 can insure that the communication protocol parameters negotiated with the network interface 22 are used in communications with the computing device 20. In this manner, the communication link negotiations can avoid potential inconsistencies in communication protocol parameters which could cause the data communication to operate at a sub-optimal level or fail completely. At a minimum, if the second negotiation cannot avoid a failed data communication (i.e., there is no common parameter that can be negotiated for both links), the user may be notified of the conflict.

Figure 5:
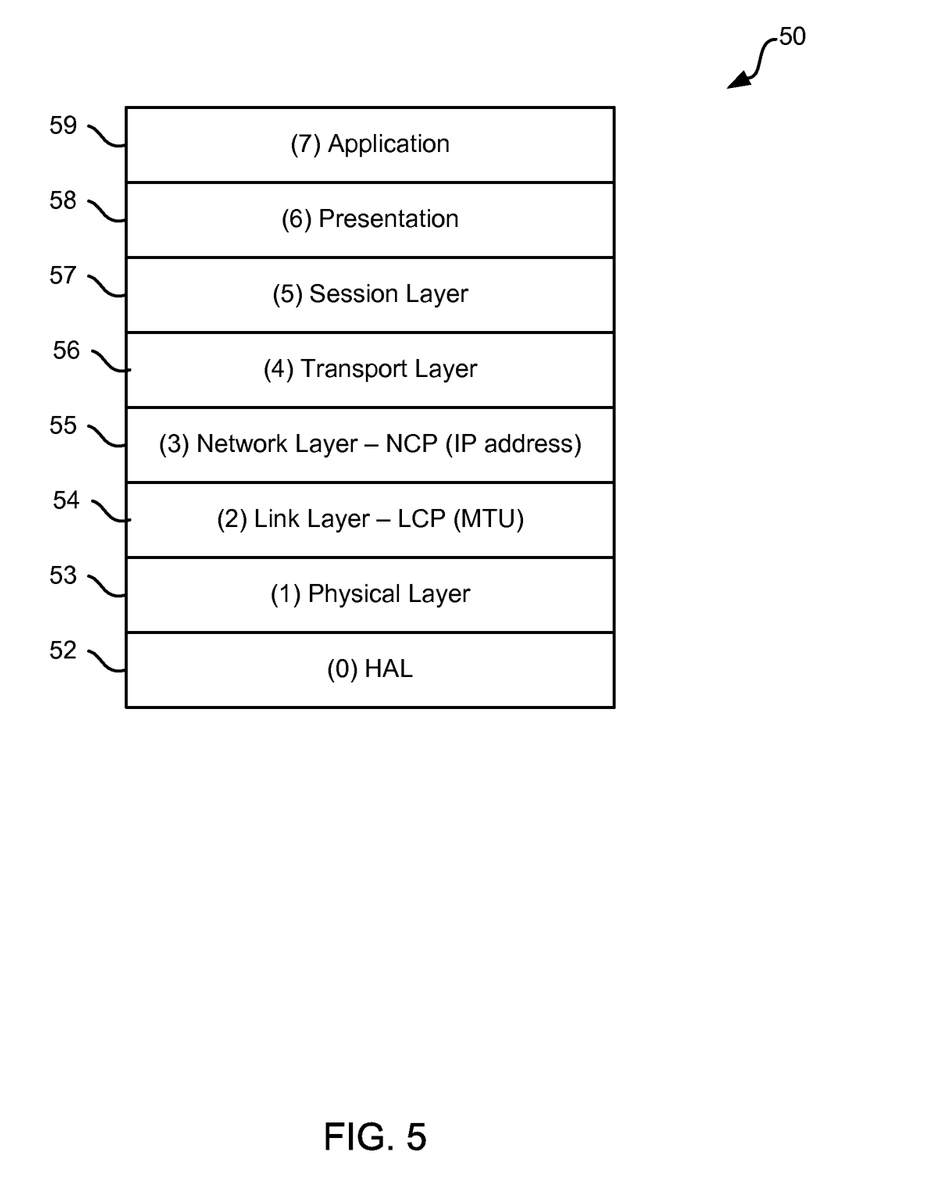
FIG. 5 is a software-system architecture interconnection model illustrating interrelationship among the various layers of software and hardware.

FIG. 5 is an open systems interconnection (OSI) model 50 illustrating the interrelationship among the various layers of a communication application and the software and hardware. As shown in FIG. 5, the (OSI) model 50 contains 8 layers. The first layer is the hardware abstraction layer (HAL) 52. The HAL 52 is an abstraction layer, implemented in software, between the physical hardware of a computing device and the software that runs on the processor. Its function is to hide differences in hardware from most of the operating system kernel, so that most of the kernel-mode code does not need to be changed to run on systems with different hardware. On a computing device, HAL can basically be considered to be the driver for the motherboard and allows instructions from higher level computer languages to communicate with lower level components, such as directly with hardware. The HAL 52 is linked to the physical layer 53. The physical layer 53 defines all the electrical and physical specifications for devices. In particular, it defines the relationship between a device and a physical medium. This includes the layout of pins, voltages, cable specification, Hubs, repeaters, network adapters, and more.

The physical layer 53 is concerned primarily with the interaction of the computing device 20 with another device, such as the mobile device 30 via a medium (e.g., a cable). The physical layer will tell the computing device how to transmit data via a cable, and another device how to receive from the medium (in most cases it does not tell the device how to connect to the medium). The major functions and services performed by the physical layer are:

- Establishment and termination of a connection to a communication medium, including the negotiation steps described above with reference to FIGS. 2 and 3.
- Participation in the process whereby the communication resources are effectively shared among multiple users. For example, contention resolution and flow control.
- Modulation, or conversion between the representation of digital data in user equipment and the corresponding signals transmitted over a communications channel. These are signals operating over the physical cabling (such as copper and optical fiber) or over a radio link.

The physical layer 53 is connected to the link layer 54. The link layer 54 provides the functional and procedural means to transfer data between network entities and to detect and possibly correct errors that may occur in the physical layer 53. In various embodiments, the two LCP operations, steps 302, 308, occur in the link layer 54. The link layer 54 is where various communication protocol parameters such as the MTU are assigned.

The link layer 54 is also connected to the network layer 55. The network layer 55 provides the functional and procedural means of transferring variable length data sequences from a source to a destination via one or more networks, while maintaining the quality of service requested by the Transport layer 56, described in more detail below. The network layer 55 performs network routing functions, and may also perform fragmentation and reassembly, and report delivery errors. Routers operate at this layer-sending data throughout the extended network and making the Internet possible. The network layer 55 is also where IP addressing occurs. The network layer 55 is responsible for fragmenting data packets into sufficiently small packets to fit within the MTU.

The network layer 55 is also connected to the transport layer 56. The transport layer 56 provides transparent transfer of data between end users, providing reliable data transfer services to the upper layers, such as the session layer 57, presentation layer 58 and applications 59. The transport layer 56 controls the reliability of a given link through flow control, segmentation/desegmentation, and error control. Some protocols are state and connection oriented. This means that the transport layer 56 can keep track of the segments and retransmit those that fail.

The transport layer 56 is also connected to the session layer 57. The session layer 57 controls the dialogues/connections (sessions) between devices. The transport layer 56 establishes, manages and terminates the connections between the local and remote applications. It provides for full-duplex, half duplex, or simplex operation, and establishes checkpointing, adjournment, termination, and restart procedures. The transport layer 56 is responsible for "graceful close" of sessions, which is a property of TCP, and also for session checkpointing and recovery, which is not usually used in the Internet protocols suite. Session layers 57 are commonly used in application environments that make use of remote procedure calls (RPCs).

The transport layer 56 is also connected to the presentation layer 58. The presentation layer 58 establishes a context between application layer 59 entities, in which the applications layer 59 entities can use different syntax and semantics, as long as the Presentation layer 58 understands both and the mapping between them. The presentation service data units are then encapsulated into Session Protocol Data Units, and moved down the stack.

The presentation layer 58 is also connected to the application layer 59. The presentation layer 58 establishes a context between the application layer 59 and the lower layers, in which the higher-layer entities can use different syntax and semantics, as long as the presentation layer 58 understands both and the mapping between them. The presentation layer 58 data units are then encapsulated into Session Protocol Data Units, and moved down the stack.

The application layer 59 sits at the top of the OSI model 50. The application layer 59 interfaces with the user and then down to the lower layers via the presentation layer 58.

Figure 6:
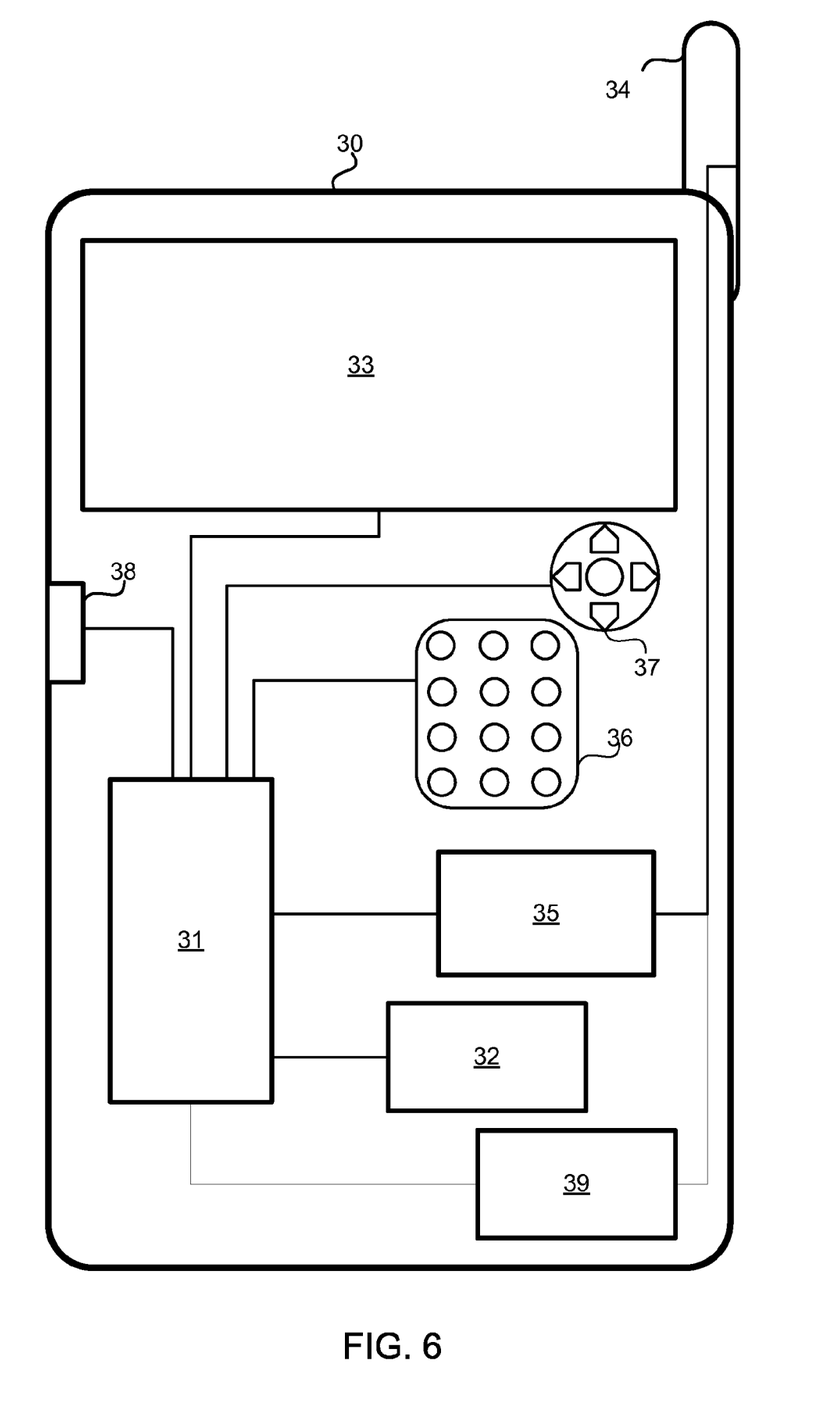
FIG. 6 is a system block diagram of a mobile device suitable for use in an embodiment.

The embodiments described herein may be implemented on any of a variety of mobile devices. Typically, such mobile devices will have in common the components illustrated in FIG. 6. For example, mobile devices 30 may include a processor 31 coupled to internal memory 32 and a display 33. Additionally, mobile devices 30 will have an antenna 34 for sending and receiving electromagnetic radiation that is connected to a wireless data link and/or cellular telephone transceiver 35 coupled to the processor 31. In some implementations, the transceiver 35 and portions of the processor 31 and memory 32 used for cellular telephone communications are collectively referred to as the air interface since it provides a data interface via a wireless data link. Mobile devices 30 also typically include a key pad 36 or miniature keyboard and menu selection buttons or rocker switches 37 for receiving user inputs. Mobile devices 30 may also include connector plugs 38 for tethering a computing device 20 to the mobile device processor 31 via data cable, USB, IEEE 1394 (Firewire), or similar data transfer standard cable. Mobile device 30 may also include a short range wireless transceiver 39, such as a Bluetooth®, WiFi transceiver or Zigbee transceiver configured to connect the mobile device 30 to a computing device 20 via an ad hoc network set up between the mobile device 30 and computing device 20.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for establishing a wireless data link between a computing device and a communication network via a mobile device, comprising:

receiving an attention command from the computing device at the mobile device; sending a response to the attention command to the computing device;

negotiating a variety of communication protocol parameters with the computing device during a first link control protocol operation;

conducting a first host authentication session with the computing device; receiving a network control protocol configuration request from the computing device;

attaching the communication network for packet service;

negotiating the variety of communication protocol parameters with a network interface during a packet data protocol context activation operation;

sending a request to negotiate the variety of communication protocol parameters with the computing device for a second time using the communication protocol parameters previously negotiated during the packet data protocol context activation operation;

negotiating the variety of communication protocol parameters with the computing device for the second time during a second link control protocol operation;

processing a second network control protocol configuration request;

restarting the network control protocol; and transmitting and receiving packets of data between the computing device and network interface over the wireless data link.

2. The method of claim 1, wherein the variety of communication protocol parameters includes a maximum transfer unit size.

3. A method for establishing a wireless data link between a computing device and a communication network via a mobile device, comprising:

conducting a first link control protocol operation, wherein a variety of communication protocol parameters are negotiated with a computing device before a packet data protocol context activation operation is completed with a network interface; and conducting a second link control protocol operation using the communication protocol parameters previously negotiated during the packet data protocol context activation operation to negotiate the variety of communication protocol parameters with the computing device.

4. A mobile device comprising:

means for receiving an attention command from a computing device;

means for sending a response to the attention command to the computing device; means for negotiating a variety of communication protocol parameters with the computing device during a first link control protocol operation;

means for conducting a first host authentication session with the computing device;

means for receiving a network control protocol configuration request from the computing device;

means for attaching a communication network for packet service;

means for negotiating the variety of communication protocol parameters with a network interface during a packet data protocol context activation operation;

means for sending a request to negotiate the variety of communication protocol parameters with the computing device for a second time using the communication protocol parameters previously negotiated during the packet data protocol context activation operation;

means for negotiating the variety of communication protocol parameters with the computing device for the second time during a second link control protocol operation;

means for processing a second network control protocol configuration request;

means for restarting the network control protocol; and means for transmitting and receiving packets of data between the computing device and network interface over a wireless data link.

5. The mobile device of claim 4, wherein the variety of communication protocol parameters includes a maximum transfer unit size.

6. A mobile device, comprising:
means for conducting a first link control protocol operation, wherein a variety of communication protocol parameters are negotiated with a computing device before a packet data protocol context activation operation has been completed with a network interface; and
means for conducting a second link control protocol operation using the communication protocol parameters previously negotiated during the packet data protocol context activation operation to negotiate the variety of communication protocol parameters with the computing device.

7. A mobile device, comprising:
a processor;
a memory coupled to the processor, wherein the processor is configured with software instructions to perform steps comprising:
receiving an attention command from a computing device;
sending a response to the attention command to the computing device;
negotiating a variety of communication protocol parameters with the computing device during a first link control protocol operation;
conducting a first host authentication session with the computing device;
receiving a network control protocol configuration request from the computing device; attaching a communication network for packet service;
negotiating the variety of communication protocol parameters with a network interface during a packet data protocol context activation operation;
sending a request to negotiate the variety of communication protocol parameters with the computing device for a second time using the communication protocol parameters previously negotiated during the packet data protocol context activation operation;
negotiating the variety of communication protocol parameters with the computing device for the second time during a second link control protocol operation;
processing a second network control protocol configuration request to the computing device;
restarting the network control protocol; and
transmitting and receiving packets of data between the computing device and network interface over a wireless data link.

8. The mobile device of claim 7, wherein the variety of communication protocol parameters includes a maximum transfer unit size.

9. A mobile device, comprising:
a processor;
a memory coupled to the processor, wherein the processor is configured with software instructions to perform steps comprising:
conducting a first link control protocol operation wherein a variety of communication protocol parameters are negotiated with a computing device before a packet data protocol context activation operation has been completed with a network interface; and
conducting a second link control protocol operation using the communication protocol parameters previously negotiated during the packet data protocol context activation operation to negotiate the variety of communication protocol parameters with the computing device.

10. A non-transitory computer-readable medium having stored thereon processor-executable instructions configured to cause a processor to perform operations, comprising:
receiving an attention command from a computing device;
sending a response to the attention command to the computing device;
negotiating a variety of communication protocol parameters with the computing device during a first link control protocol operation;
conducting a first host authentication session with the computing device;
receiving a network control protocol configuration request from the computing device;
attaching a communication network for packet service;
negotiating the variety of communication protocol parameters with a network interface during a packet data protocol context activation operation;
sending a request to negotiate the variety of communication protocol parameters with the computing device for a second time using the communication protocol parameters previously negotiated during the packet data protocol context activation operation;
negotiating the variety of communication protocol parameters with the computing device for the second time during a second link control protocol operation;
processing a second network control protocol configuration request to the computing device;
restarting the network control protocol; and
transmitting and receiving packets of data between the computing device and the network interface over a wireless data link.

11. The non-transitory computer-readable medium of claim 10, wherein the variety of communication protocol parameters includes a maximum transfer unit size.

12. A non-transitory computer-readable medium having stored thereon processor-executable instructions configured to cause a processor to perform operations, comprising:
conducting a first link control protocol operation wherein a variety of communication protocol parameters are negotiated with a computing device before a packet data protocol context activation operation has been completed with a network interface; and
conducting a second link control protocol operation using the communication protocol parameters previously negotiated during the packet data protocol context activation operation to negotiate the variety of communication protocol parameters with the computing device.

* * * * *